Patented Oct. 21, 1947

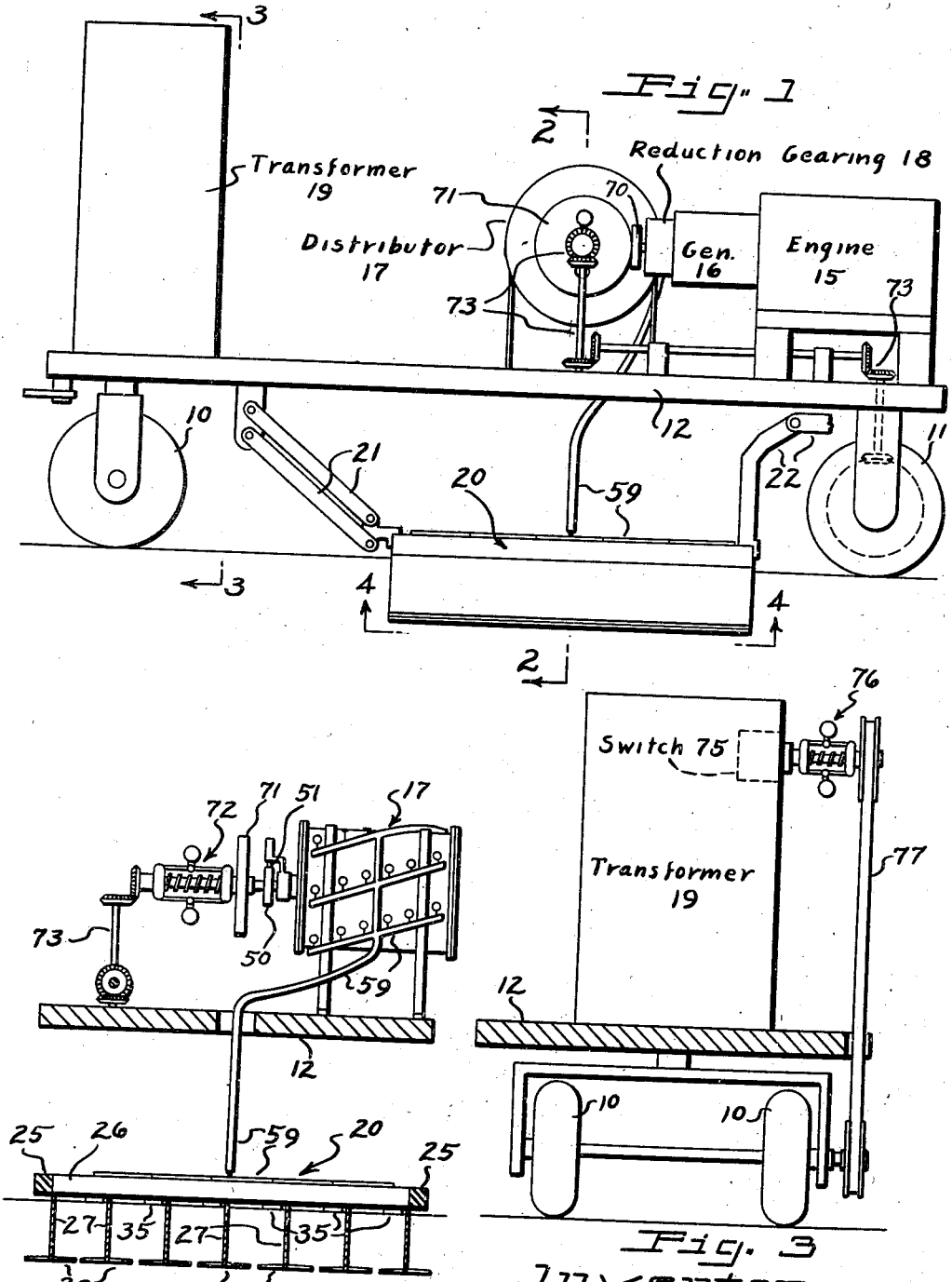

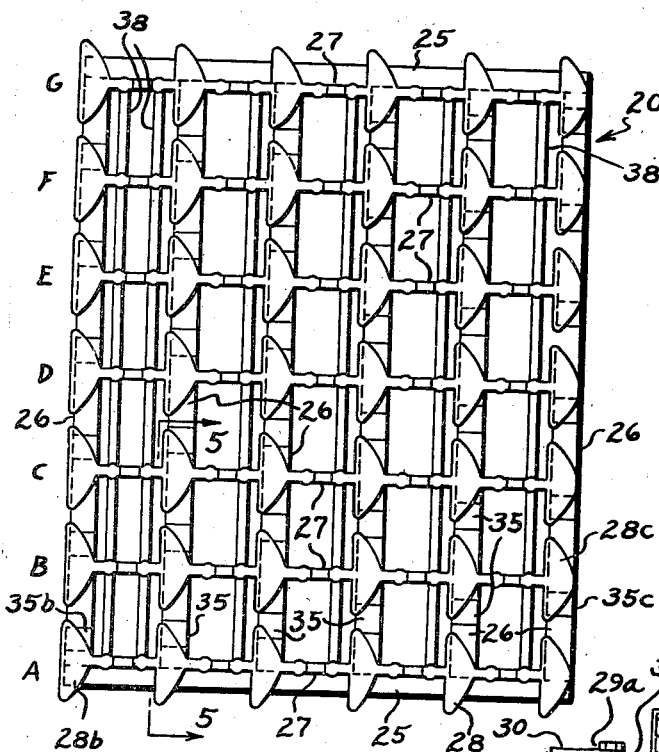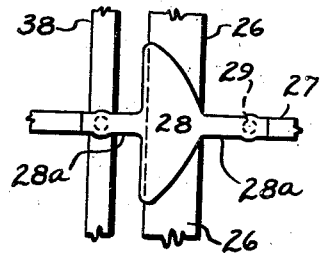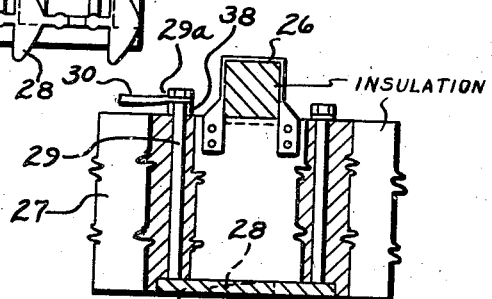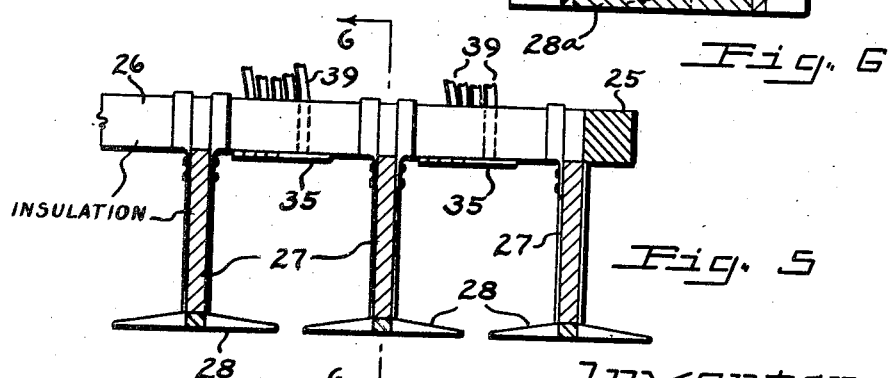

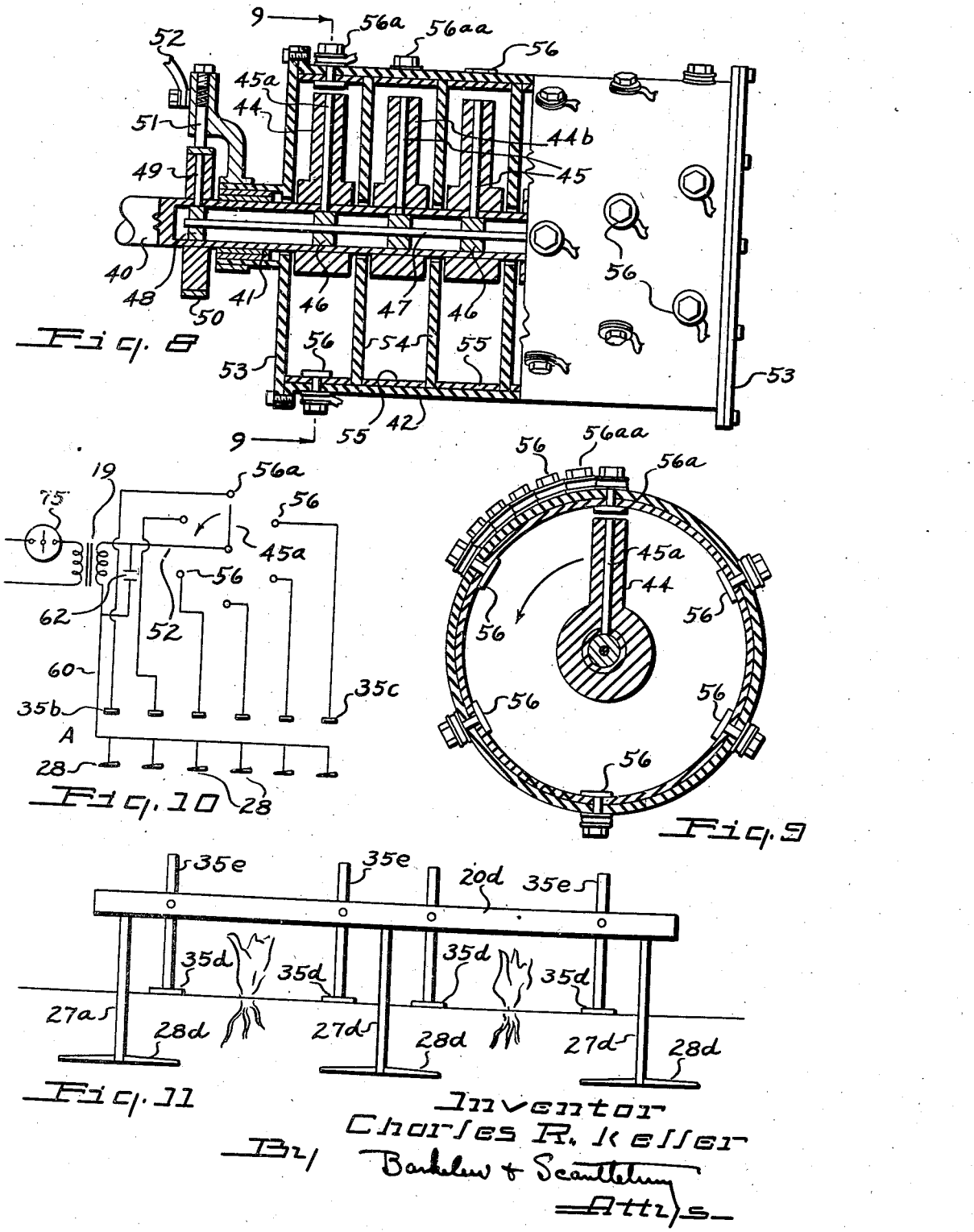

2,429,412

UNITED STATES PATENT OFFICE 2,429,412

SYSTEM FOR ELECTRICALLY TREATING SOIL

Charles R. Keller, Santa Paula, Calif.

Application February 28, 1944, Serial No. 524,257

13 Claims. (Cl. 47—1.3)

Certain proposals have been made for electrical treatment of soil, for the purposes of weed destruction, sterilization, and destruction of other forms of animal and plant life. In some of these electrical energy is applied to laterally spaced pairs or sets of soil contacts, the arrangement being such that the current flow between oppositely charged contacts is in a horizontal direction through the surface soil. If the charged contacts are applied to the tops of weeds at a time when the soil surface is relatively dry, then the current flow may tend somewhat to follow the root systems into the soil, but it has been found that current flow does not penetrate the soil to any substantial depth and that the system is therefore not effective in the destruction of such deep lying pests as wireworm and other organic matter which commonly lies at some considerable depth in the soil. Although my invention is not at all limited in this regard, I particularly mention the previously named pests which are responsible for extremely large economic losses to growers of a great variety of food produce. Various other eradication systems have been tried and to some extent used against those pests, but without signal success and requiring large expenditures in money and time.

One of the primary purposes of my present invention is the provision of a system, an apparatus and method of operation, whereby I am enabled to apply intense electrical treatment to the soil to a considerable depth, the depth of treatment being only limited by the depth to which it is practicable to run a series or set of soil distributing electrodes. The depth of treatment is thus limited in practice only by such physical considerations as those which are ordinarily taken into account in determining maximum practicable depth of soil disturbance.

Applied to such a maximum practicable depth, or to a lesser depth sufficient for the purposes in view, my system not only thoroughly disturbs the soil to that depth, but also applies to all parts of the soil, to that depth, an electrical current treatment sufficient to destroy all pestiferous organic matter but also sterilizes and simultaneously cultivates and aerates the soil to substantial depth. And, as will be pointed out, the system may not only be used for initial planting preparation of the soil but also for subsequent cultivation and treatment between the rows of growing plants.

By way of illustration of forms of apparatus in which my invention may be embodied and practiced, the accompanying drawings show by diagrammatic representation, typical forms of such an apparatus. In these drawings:

Fig. 1 is a diagrammatic side elevation of a portable treatment apparatus;

Fig. 2 is a diagrammatic section taken as indicated by line 2—2 on Fig. 1, showing the electrical distributor in elevation;

Fig. 3 is a diagrammatic section taken as indicated by line 3—3 on Fig. 1;

Fig. 4 is a bottom plan of the soil disturbing and electrode carrying unit of the system, the aspect of this figure being indicated by line 4—4 on Fig. 1;

Fig. 5 is an enlarged fragmentary section taken on line 5—5 of Fig. 4;

Fig. 6 is a detailed fragmentary section on line 6—6 of Fig. 5;

Fig. 7 is an enlarged fragmentary bottom plan showing one of the electrodes shown in Fig. 4;

Fig. 8 is a view of the distributor, partly in side elevation and partly in longitudinal central section;

Fig. 9 is a cross section on line 9—9 of Fig. 8;

Fig. 10 is a diagram of the electrical circuiting of the system, and

Fig. 11 is a diagrammatic end view of a modified form of soil disturbing electrode unit.

Stated broadly and briefly, the apparatus of my system includes a soil penetrating and disturbing electrode unit constructed and arranged to be drawn over and through the soil; a suitable source of electrical energy at a relatively high potential; and preferably a distributor which acts to apply the treatment current successively to the several electrodes of the electrode set, so that a heavy and intense treatment current may be applied to the electrodes without necessitating too large a power source. It will be understood from the following description that such a distributor is desirable because of the practical desirability of utilizing a fairly large number of spaced electrode sets instead of merely one, to cover an efficiently wide strip of soil on each passage of the apparatus, and because it is highly desirable to give each electrode a sufficiently heavy current to insure the desired results.

The apparatus may be designed, mounted or carried in any manner suitable for moving it over and through the soil, and thus for instance may be carried upon any suitable carriage, such as upon a tractor or trailer. In the drawings I indicate diagrammatically a trailer having supporting wheels 10 and 11 and bed 12 upon which the various units of the apparatus may be mounted and suspended. An engine is indicated generally at 15 driving a generator 16. The distributor is indicated generally at 17 driven from the engine and generator shaft through a reduction gearing which is indicated at 18. The generator is in practice preferably an A. C. generator, and a transformer indicated at 19 is used to step the generator voltage up to the relatively high voltage desired, say 10,000 to 20,000 volts.

The soil disturbing and treating unit is indicated generally at 20 in Fig. 1, shown more or less merely diagrammatically in that figure but shown in detail in Figs. 4 to 7. This unit may be suspended below body 12 in any suitable manner so that it can be raised and lowered. I have indicated in Fig. 1 a known form of suspension which has the advantage of keeping the suspended unit in positions parallel to itself as it is raised and lowered. The preferred suspension, being well known, requires no detailed explanation; but it embodies a parallel movement comprising two parallel links 21 which are connected between bed 12 and one end of unit 20, and a linkage or other system 22 by which the other end of unit 20 may be raised and lowered. When the latter mentioned end of unit 20 is raised or lowered, the action of the parallel linkage 21 causes the first mentioned end of the unit to be equally raised or lowered.

A typical design and structure of the treatment unit 20 is shown in Figs. 4 to 7. A suitable framework may consist of two longitudinal frame members 25 and a series of lateral, longitudinally spaced, cross members 26. All of these members, or at least the cross bars 26, may preferably be of insulating material, conveniently to insulate the several electrodes which are carried by cross members 26. Mounted on the under side of cross bars 26 and extending down from them, are the laterally spaced runners 27, also preferably of insulating material. These longitudinal runners, as shown, are in the form of long flat bars or plates, thin enough to make easy progress longitudinally through the soil. Their vertical width dimension is determinative of the depth of soil penetration of the soil disturbing electrode knives 28 which are carried upon their lower edges. The function of runners 27 is merely to carry the knives at the desired soil depth; and any other suitable knife carrying structure can be used. The one illustrated here is advantageous because each such runner can carry a plurality of knives in a longitudinal line and the runners can also be designed to form a structural part of the frame. In fact, the runners may form exclusively the longitudinal elements of the frame, side members 25 being omitted.

Each runner 27 carries at its lower edge a longitudinally spaced plurality of the knives 28, one such knife being mounted on each runner directly below each cross bar 26. A suitable manner of mounting the knives is shown in detail in Figs. 6 and 7. Each knife has longitudinal extensions 28a and fits into a recess into the lower edge of runner 27. Holding bolts 29 pass up through the runner, and the head end of one of these bolts, as at 29a may be used as an electrical connector for the insulated cable 30 or bus bar 38 which feeds current to the knife.

Electrode plates 35 are mounted on the under sides of cross bars 26 in the relationship to the knives which is shown in Figs. 4 and 5. For instance electrode plates 35 on the forward (left hand) cross bar 26 are located so as to be substantially directly above the several knives 28. For instance the electrode shown at 35b is substantially directly above the knife shown at 28b. On the rearmost cross bar 26 the electrode shown at 35c is substantially directly above the knife shown at 28c; and the intermediate electrodes, of the line of electrodes of which 35b and 35c form the end elements, are arranged in a diagonal line as is shown in Fig. 4. Thus the arrangement is such that the electrodes on the foremost beam are substantially directly over certain knives; and on successive beams toward the rear the electrodes are progressively laterally displaced from positions directly over the corresponding knives; and upon the rearmost cross beam the electrodes are laterally displaced so that they are substantially directly over electrodes which are in the next electrode row.

The electrode arrangement which has been described has the advantage that the current flow through the soil from any one knife to any one electrode is relatively concentrated and proportionately intense; and at the same time that the current path through the soil is relatively displaced from one electrode set to the next in the longitudinal line of electrodes, so that all of the soil through which the device is run will be thoroughly treated.

Electrode plates 35 are intended to ride the surface of the soil, and they may either be rigidly and fixedly affixed on the under sides of beams 26 or may be vertically adjustable thereon to adjust the depth of soil penetration of knives 28. (See Fig. 11, described hereinafter.) And the knives 28 may be made of any suitable configuration to facilitate their easy progress through the soil and to cause them to dig in sufficiently to keep them at their proper depth.

In making the electrical connections to knife electrodes 28 and plate electrodes 35, either of those sets of electrodes may be connected in parallel to one common lead from the electrical source, and the other set of electrodes be connected to the source through the distributor. In the drawing I have shown the lower knife electrodes 28 all connected to a common lead; that is, as if electrically the several electrodes 28 were a single continuous electrode. Transverse bus bars 38 may conveniently make cross connection between the several electrodes 28 in each transverse row, and then a common insulated cable lead, such as is indicated at 30 in Fig. 6, may connect to all of the bus bars 38. Seeing that all of the knife electrodes 28 are thus shown with a common connection, the several electrode plates 35 are shown, as in Fig. 5, to have individual cable leads 39 which go to the distributor, as will be explained.

The distributor is shown more particularly in Figs. 8 and 9. The housing shaft 40, preferably of insulating material, is journaled at 41 to rotate axially in a casing 42 also of insulating material. Within the casing a plurality of disks, or equivalent arms 44 of insulating material, are spacedly mounted on shaft 40 to rotate therewith. In each arm 44 there is a radial conductor 45, the inner ends of these several conductors joining conductor collars 46 which engage a central conductor rod 47. At its outer end rod 47 conductively engages a collar 48 from which a conductor 49 extends radially to a collector ring 50, against which a brush 51 bears. A single conductor cable, such as indicated at 52, forms the single in-put connection to the distributor.

Casing 42 has insulating end plates 53 and also has insulating partition disks 54 between the several spaced distributor arms 44, disks 54 being spaced apart by spacer rings 55 also of insulating material. The outer distribution terminals 56 of the distributor extend through outer casing 42 and the spacer rings 55.

Assuming that there are six knife electrodes 28 and also six upper electrode plates 35 in each longitudinal row in soil treating unit 20, as shown for instance for the rows A, B, C, etc., in Fig. 4, then each set of outer distribution terminals 56 will consist of six such electrodes equidistantly spaced around the distributor casing. Assuming that there are six longitudinal rows of electrode plates 35 (A to F inclusive in Fig. 4) then in the distributor there will be six longitudinally spaced distributor arms 44 and six corresponding sets of distribution terminals 56 aligned with the several arms. Then, assuming that all of the distributor arms 44 are in longitudinal alinement with each other, the several sets of distribution terminals 56 will be arranged in the relation shown in Figs. 8 and 9, not in longitudinal alignment with each other but with each set spaced circumferentially from the next by one-thirty-sixth of a circle. Thus, if terminal 56a is considered the first terminal in the first set, then the corresponding first terminal 56aa of the second set is circumferentially spaced from 56a by one-thirty-sixth of a circle, as shown in Fig. 9; and the remaining terminal sets are similarly successively spaced. In Fig. 9 all of the terminals of the first set are shown, but for clarity of illustration only the first terminals (as 56aa) of the succeeding sets are shown.

The first set of six terminals 56 (for instance the set shown in Fig. 9) will be severally connected, for instance, to the electrode plates 35 of the row A shown in Fig. 4. Such connection is illustrated diagrammatically in Fig. 10. Assuming distributor rotation in the direction indicated, the first terminal 56a is shown connected to the first electrode plate 35b of the row A, the last terminal 56b is shown connected to the last electrode plate 35c of row A, and the intermediate electrodes are shown connected in order. Row B of electrodes 35 will be similarly connected to the next set of terminals 56, the first electrode of row B being connected to the first terminal of that row, indicated at 56aa; and the remaining rows of electrodes C, D, E and F will be connected to the successive ones of the six sets of terminals 56 in the same successive relationships. The corresponding connecting cables are physically shown at 59 in Figs. 1 and 2. The diagram of Fig. 10 also shows the several knife electrodes 28 connected by a common lead 60 to the secondary of transformer 19, and shows the other lead 52 from the transformer secondary going to the center of the distributor 17.

Assuming that the distributor is rotating, say, in the direction indicated by the arrow in Fig. 9, current is being conducted through arm conductor 45a shown in Fig. 9 and through terminal 56a to the first electrode 35b in row A of Fig. 4. As the distributor rotates, current will be successively conducted through the several terminals 56, progressing in a direction left-handedly around Fig. 9 until conduction occurs last through the last terminal 56b when arm 45a passes that terminal. Thus current will be fed in equi-spaced succession to the six electrode plates 35 of row A of Fig. 4 once during each distributor rotation. Just after distributor arm 45a registers with, or passes, first terminal 56a, the next distributor arm 44b will register with the first terminal 56aa of the next terminal set, and distribution to that set and to electrode row B will then take place in succession, lagging one thirty-sixth of a circle behind the respective terminals of the first set. In the same manner distributions to the successive terminal sets and to electrode rows C, D, E and F will follow each other in regular succession. Each electrode will thus receive one current impulse during each distributor revolution. But, if desired, the number of impulses to each electrode per revolution may be increased by the simple expedient of providing a plurality of spaced distributor arms for each set of terminals 56.

Due to the relative spacings of the several sets of terminals in the distributor, the distribution of current to the successive electrode rows will be in regular succession and no two electrodes of the whole number will be fed coincidently with current. The live period of any one terminal 56 and its corresponding electrode 35 may overlap the live periods of terminals and electrodes which are rendered live just before and after the one in question, but their periods will not in any case be co-terminous. And whether they overlap or not depends upon the relative circumferential extents of the conductive distributor arms 45 and of the terminals 56. If those relationships are made such that the successive live periods somewhat overlap, then the advantage is gained that the secondary circuit of the transformer is never completely broken. During a major portion of the complete cycle of operation the whole available current will be concentrated at a single electrode, and during a minor portion of the cycle will two electrodes 35 be energized. If, on the other hand, the circumferential dimensions of the distributor be made such that there is no such overlap, and the secondary current is completely broken after each energization of each electrode 35, then a capacity 62 may be across the secondary circuit, and each electrode 35 will receive a heightened surge of current when it is energized by the distributor. And in that case the whole available current will at no time be divided between two electrodes 35.

In any case, the whole available current will be successively applied to the several electrodes 35. When thus applied to one electrode, the whole current flow is concentrated in a path through the soil leading directly from that electrode 35 to the nearest knife electrode or electrodes 28. The soil is thus thoroughly treated with a concentrated high voltage and heavy current at each electrode; and the relative placements of the electrodes and their successive energization cause all of the soil under the treating unit to be subjected to deep treatment.

The described design of the distributor enables it to be rotated at very low speed, as all of the electrodes 35 are successively energized during each single distributor rotation. Consequently the distributor has only to rotate once during the progress of the electrode set along the ground by a distance of approximately its own length. If the distributor rotates that fast or somewhat faster, then the soil in a strip as wide as the complete treating unit 20, will be completely and thoroughly treated. The distributor is thus to be driven at a rotational speed proportionate to the speed at which the trailer traverses the ground; and that drive could be a drive taken directly, in the proper ratio, from one of the trailer wheels. However, as there is always liability of slippage of such a wheel on farming land if any amount of power is taken from it, I prefer to drive the distributor from engine 15 which will preferably be provided with a speed governor; and then govern the speed at which the distributor is driven by a governor which is actuated from a trailer wheel. Thus, in Fig. 1 I indicate that there may be a reduction gearing at 18 and from that reduction gearing a friction disk 70 is driven. That friction disk is engaged by a movable friction disk 71 which is shown both in Figs. 1 and 2. Friction disk 71 is mounted on one end of a speed governor 72, whose function is to move disk 71 to the right or left in Fig. 2 and thus vary the radius of its engagement with friction disk 70. The governor is driven through a gear and shafting train 73 from one of the trailer wheels 11. The whole arrangement is so designed and adjusted that, assuming a constant speed of engine 15, the distributor will be uniformly driven at the desired speed relative to the ground progress of the soil treating unit 20.

It is desirable to make provision for deenergizing the whole system until it reaches a reasonable speed of ground travel, say two or three miles per hour, or if the speed falls below such a value. For this purpose a cut-out switch 75 may be placed in the transformer primary circuit and actuated by a speed control governor 76 which is driven, as indicated at 77, from one of the trailer wheels or from an axle.

It will be recognized that the lower soil penetrating electrodes 28 not only act as electrodes but also as soil distributors. For the former purpose their plan configurations and extents are made with a view to the electrical treatment covering the whole ground area. They are therefore spaced rather closely longitudinally, and those of adjacent rows approach each other rather closely. For the latter purpose the electrode shapes may be made to attain any desired type of soil movement, breaking, turning and aeration. The combination of cultivation, aeration and electrical treatment I regard as important; and my system may be used for operation between rows as well as for pre-planting treatment. In Fig. 11 I show, as an illustration, how the treatment unit may be modified for operation between rows. In that figure I show diagrammatically an end elevation of a unit having a frame 20d and several longitudinal rows of knife electrodes 28d mounted on the lower edges of rather deep runners 27d. The upper electrode plates 35d are shown as mounted on the lower ends of standards 35e which are vertically adjustable in the frame so that the relative levels of the surface riding electrodes 35d can be varied to adjust the depth of knives 28d and also to adjust the plant-straddling height of frame 20a. The number of rows of cultivating electrodes 28d may be as desired, and the spacings and electrical connections of the several electrodes will be as before described.

Either alternating or direct current may be used in my system. While I have treated of the upper electrodes 35 as riding the soil surface, it will be understood that they may cut into the surface, or may be even formed to cut into the soil below the surface to aid in cultivation and soil disturbance. It is only requisite that the upper electrodes contact the soil, at a level above the lower knife electrodes.

I claim:

1. Apparatus for treating soil in place, comprising a frame traversible over the soil, a pair of electrodes mounted on the frame in vertically spaced relation to each other, the upper one of said electrodes being mounted on the under side of the frame and having a lower surface adapted to ride the surface of the soil, the lower one of said electrodes being in the form of a soil penetrating knife adapted to be drawn horizontally through the soil at a distance below the soil surface, rigid insulative supporting means mounted on the frame, extending downwardly therefrom and carrying the lower electrode at its lower end, the uppermost face of the lower electrode being spaced vertically a substantial distance below the lower soil contacting face of the upper electrode, the two electrodes being electrically unconnected to each other and the lower electrode being insulated from the frame and from the upper electrode by said insulative support, and circuit means for applying a potential difference to the two electrodes thereby to set up a soil penetrating current vertically between them through the soil, said means including a connection to the lower electrode which connection is insulated from contact with the soil.

2. Apparatus for treating soil as specified in claim 1, and in which the lower electrode of the pair is shaped for soil disturbance.

3. Apparatus for treating soil as specified in claim 1, embodying a plurality of pairs of the electrodes, and means associated with the electrical circuit means acting to supply energy successively to the several electrode pairs.

4. A soil treating unit comprising a horizontal frame, a plurality of laterally spaced longitudinal insulative soil penetrative runners mounted on and projecting downwardly from the frame, a plurality of longitudinally spaced soil penetrating and electrically conductive knives mounted on the lower edge of each runner, electrical connection to the several knives, said connection being insulated from contact with the soil, a plurality of soil contacting electrodes mounted on the frame with the electrodes at a level substantially above the knife level, the several knives being electrically unconnected to the several electrodes and electrical circuit means, including said insulated connection, for applying a potential difference between the knives and the electrodes, whereby a potential difference is applied vertically to the soil in place between the knives and the electrodes.

5. A soil treating unit as specified in claim 4, and in which the soil contacting electrodes are mounted on the under side of the frame in longitudinal rows located between adjacent runners.

6. A soil treating unit as specified in claim 4, and in which the soil contacting electrodes are mounted on the under side of the frame in longitudinal diagonal rows located between adjacent runners.

7. A soil treating unit as specified in claim 4, and in which the soil contacting electrodes are mounted on the under side of the frame in longitudinal diagonal rows located between adjacent runners, the electrode at one end of a row being substantially directly over a knife located on one runner, and the electrode at the other end of that row being substantially directly over a knife located on the adjacent runner.

8. Apparatus for treating soil in place comprising a carriage mounted on ground wheels, a frame traversible over the soil and mounted on the carriage, a plurality of horizontally spaced pairs of electrodes mounted on and below the frame, the electrodes of each pair being mounted on the frame in vertically spaced relation to each other, the upper one of said electrodes of each pair being mounted on the underside of the frame and having a lower surface adapted to ride the surface of the soil, the lower one of said electrodes of each pair being in the form of a soil penetrating knife adapted to be drawn horizontally through the soil at a distance below the surface, rigid insulative supporting means mounted on the frame, extending downwardly therefrom and carrying the several lower electrodes at its lower end, the uppermost face of each of the lower electrodes being spaced vertically a substantial distance below the lower soil contacting faces of the upper electrodes, the several pairs of electrodes being electrically unconnected with each other, the two electrodes of each pair being electrically unconnected to each other, and the several lower electrodes being insulated from the frame and from the corresponding upper electrode by said insulative support, and circuit means, including a distributor means mounted on the carriage, for applying a potential difference successively to the two electrodes of the several pairs, thereby to set up a soil penetrating current vertically through the soil successively between the electrodes of the several pairs, said circuit means including connections to the several lower electrodes which connections are insulated from contact with the soil.

9. Apparatus as specified in claim 8, and also including means for driving the distributor at a speed proportionate to the speed of ground travel of the carriage.

10. Apparatus as specified in claim 8, and also including a prime mover mounted on the carriage, variable speed transmission whereby the distributor is driven from the prime mover, and means governed by the speed of travel of the carriage and controlling the variable speed transmission.

11. Apparatus as specified in claim 8, and also including means governed by the speed of ground travel of the carriage and acting to de-energize the electrodes whenever the speed of travel is below a predetermined value.

12. The method of electrically treating soil in place, including the step of applying an externally generated high potential difference to the soil between a level at its surface and a level spaced below its surface, and thereby forcing a current flow through the soil between the two levels.

13. Method of disturbing and simultaneously electrically treating soil in place, including the steps of moving a soil disturbing electrode through the soil at a predetermined depth below the surface and in electrical contact with the soil exclusively at that predetermined depth, moving another electrode in soil contact above the first mentioned electrode, and applying an electrical difference of potential to the two electrodes to thereby cause a current flow through the soil between the two electrodes.

CHARLES R. KELLER.

REFERENCES CITED

The following references are of record in the file of this patent:

UNITED STATES PATENTS

| Number | Name | Date |
|---|---|---|
| 799,403 | Sidwell | Sept. 12, 1905 |
| 1,952,588 | Golden | Mar. 27, 1934 |
| 2,007,383 | Opp | July 9, 1935 |

FOREIGN PATENTS

| Number | Country | Date |
|---|---|---|
| 167,608 | Great Britain | Aug. 18, 1921 |
| 347,418 | Great Britain | Apr. 30, 1931 |